Jan. 29, 1935. H. C. RASSMANN 1,989,152
BEET HARVESTER
Filed Dec. 30, 1932 2 Sheets-Sheet 1
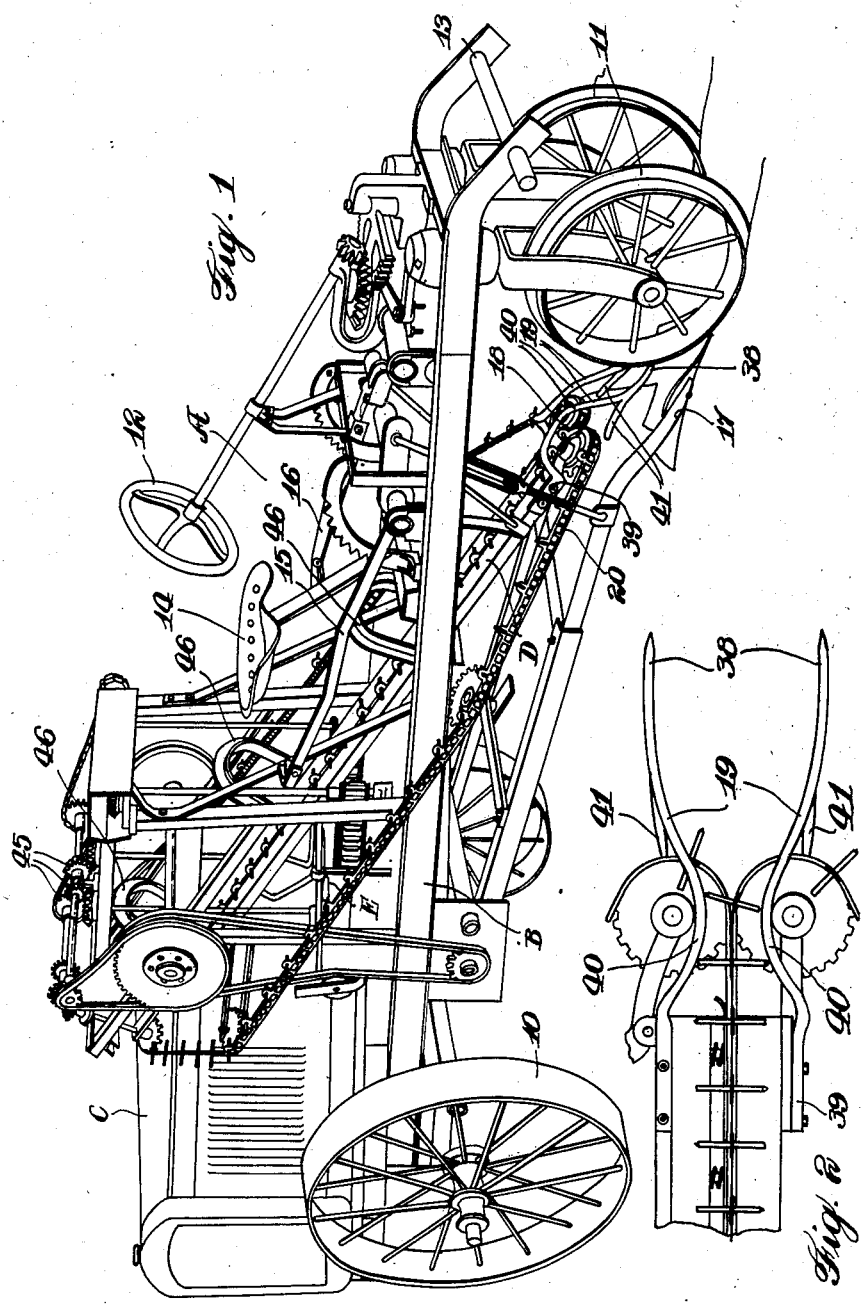
Inventor
Hugo C. Rassmann
By
Attorney

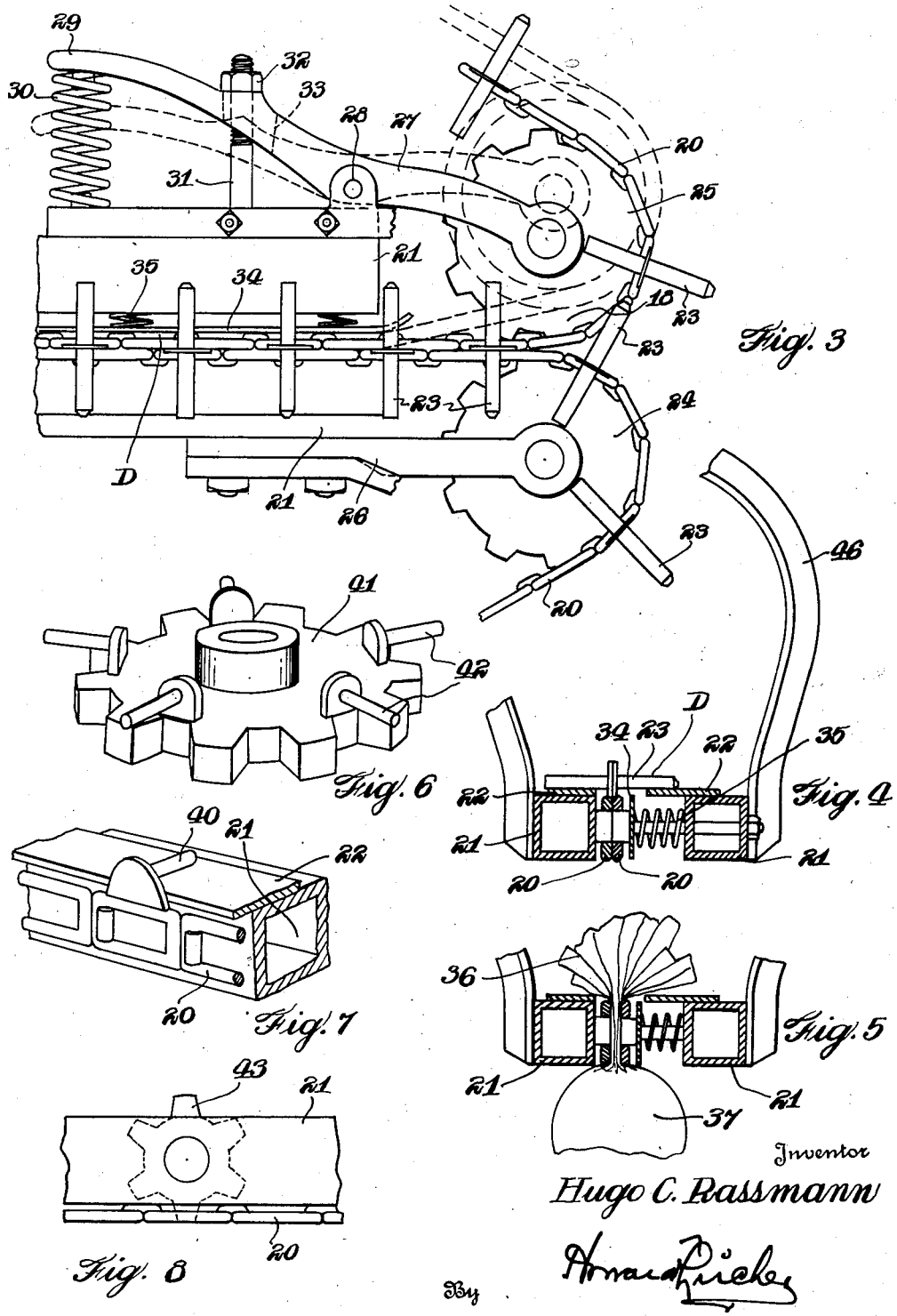

Patented Jan. 29, 1935

1,989,152

UNITED STATES PATENT OFFICE 1,989,152

BEET HARVESTER

Hugo C. Rassmann, Beaver Dam, Wis., assignor of one-half to George Pierson, Chaska, Minn., and one-half to John A. Diethelm, Victoria, Minn.

Application December 30, 1932, Serial No. 649,478

13 Claims. (Cl. 55—108)

My invention relates to a beet harvester which is provided with means for elevating the beets out of the ground and includes a means of carrying the beets with the foliage to the cutter which tops the beets automatically separating the foliage from the beets in the operation of the harvester.

A primary feature resides in a conveyor for carrying the foliage of the beets in upright position to the cutter, making the operation more simple and positive in effectiveness to top the beets rapidly as they are carried into the harvester, all of which operation is automatic.

It is also a feature to provide a spring track between which the belts of the carrier or chain which carry the beets run, permitting the belts to expand or contract in accordance with the thickness of the foliage between the same, thus carrying the beets readily along the conveyor of the harvester to the cutter.

Further, I provide a guide for the conveyor chains which may include fingers or lugs carried by the links of the chains and a track means on which these lugs slide to hold the conveyor chains in operative position along the spring track while conveying the beets with the foliage of the same held between the chains under spring tension and carrying the same into the harvester immediately after they are elevated out of the ground.

My beet harvester is provided with a resiliently mounted guiding sprocket which operates to move automatically in a manner to open the space between the conveyor chains as a beet enters the conveyor directly after it is elevated out of the ground. This resiliently mounted sprocket means also is provided with an adjusting means for holding the sprocket in a set position at the entrance end of the conveyor. By this adjusting means the sprocket may be set so as to open to a more or lesser degree the conveyor at the entrance of the same. The resilient mounting of the sprocket means at the entrance of the conveyor permits the foliage of any of the beets as they are carried into the same to automatically open the conveyor at the receiving end. This is important as it permits the harvester to operate under all conditions and without any undue strain against any of the parts when there is more or less foliage and different sized beets, and thereby provides a more efficient beet harvesting device.

The harvester inclues a conveyor wherein the conveyor chains are provided with supporting lugs which may be extended only on one side of the chain and in which case the sprockets at the entrance of the conveyor are provided with gripping lugs in between the alternating teeth thereof. In the other construction of the conveyor chain in the same is provided with interfitting lugs which project on either side of the chain and one side of which rides along the track on top of the guide members which support conveyor chains as they travel from the entrance of the conveyor up toward the cutter which is located within the harvester and near the back portion thereof.

Further, the harvester is provided with a means of guiding the beets and foliage thereof at the entrance of the conveyor of the harvester. This guiding means is important in guiding the beets into the conveyor and assists in collecting the foliage even though it may lie down on the ground and guiding the same into an upright position so that it may be collected by the guide pins or lugs of the conveyor chain and carried between the spring tracks of the conveyor up to the cutter which tops the beets of the foliage. The guide is formed with prong-like ends which project outwardly above the lifting plow and forwardly of the receiving end of the conveyor and which are of a rod-like nature having upwardly and backwardly extending portions which converge toward each other and which loop over the top of the guide sprockets at the receiving end of the conveyor and which are secured to the conveyor track. Beneath the upwardly arched portions which extend over the sprockets rearwardly extending guide-like prong portions extend below the guide sprockets. Thus the space between the upper arched portions and these lower rearwardly extending portions is provided for the operation of the collecting and guiding lugs which are carried either by the chain or the sprockets at the entrance of the conveyor and which operate to collect the foliage and gather it into the track as foliage collecting fingers.

The features, details and importance of the function and construction will be more fully and clearly set forth.

In the drawings forming part of this specification:

Figure 1 is a perspective view of my beet harvester, showing the parts as they would appear in operative position.

Figure 2 is a plan view of a detail of the front end of the conveyor and guiding prongs associated therewith.

Figure 3 is an enlarged plan view of the receiving end of the conveyor of the harvester.

Figure 4 is a sectional detail through the guiding track of the same.

Figure 5 is a similar view to Figure 4, showing the conveyor carrying a beet.

Figure 6 illustrates an alternative form of the guiding sprockets at the receiving end of the conveyor.

Figure 7 is a detail partly in section of the form of chain and guiding lugs used with the sprocket structure of Figure 6.

Figure 8 is a detail showing another form of supporting the conveyor chains along the guiding track which extends into the harvester and where the conveyor chain does not have the guiding lugs projecting from the side of the same.

My beet harvester A is constructed with a frame B mounted upon the rear wheels 10 and front guiding wheels 11. By means of the steering wheel 12 the harvester A may be guided as it is pulled from the hitch end 13 which may be connected to a tractor or any other suitable means for drawing the harvester through the beat field.

The mechanism of the harvester A may be operated by a separate engine unit C mounted at the rear of the frame B. The operator of the harvester A is provided with a seat 14 and by means of the levers 15 and 16 the beet elevating plow 17 and the receiving end 18 with the guiding prongs 19 are raised and lowered in accordance with the desire of the operator.

A primary feature of the harvester A is the conveyor D which is provided with endless chains 20 adapted to operate along the inclined frame composed of the tubular members 21 which are spaced apart in a manner to permit the conveyor chains 20 to operate between the same.

The frame members 21 are provided with wearing track plates 22 on top of the same upon which the fingers or lugs 23 which are carried by the links of the chains 20 slide as the chains 20 pass along between the frame members 21 in the operation of the harvester A. The fingers or lugs 23 are connected to the links of the chains 20 so that they alternate in position in relation to the respective links of the chains, and thereby interfit with each other as the link chains 20 are operated. This permits the fingers or lugs 23 to be comparatively close together when travelling up the inclined track frame 21, as indicated in Figure 1 and in Figure 3.

The receiving end 18 of the conveyor D is provided with sprocket wheels 24 and 25. The sprocket wheel 24 may be mounted by the bracket arm 26 to the front end of the frame member 21 to hold the same in rigid operating position while the sprocket 25 is resiliently mounted by the arm 27 which is pivoted at 28 and which is provided with an end 29 engaging against the coil spring 30. An adjusting bolt 31 is mounted on the side of the frame 21 and by means of the nut 32 the relative position of the sprocket 25 may be adjusted in relation to the sprocket 24 so as to open or close the receiving end of the conveyor D as appears in dotted outline in Figure 3. A slot 33 in the arm 27 permits the arm to slide over the bolt 31. The nut 32 limits the movement of the sprocket 25 toward the sprocket 24 which is automatically held in operative position by the spring 30. This construction provides a resilient receiving end between the sprockets 24 and 25 of the conveyor D so that when the plow 17 raises the beets out of the ground and the prongs 19 guide the foliage up between the chains 20 and the fingers 23 collect the foliage and guide it in between the chains 20, the receiving end 18 of the conveyor can expand and contract to fit the respective foliage and beet received therein in the operation of the harvester A. This provides a very desirable receiving end for the conveyor D and prevents any crowding or undue strain on the receiving parts of the conveyor.

The conveyor D is formed with a resilient side plate 34 held in operative position to bear against one of the chains 20 by means of a series of coil springs 35 which urge the bearing plate 34 toward the chain 20 in a manner to keep the respective chains 20 in spring contact with each other as they travel between the side frames 21. This structure permits the chains to open between each other sufficiently to receive and engage the foliage 36 of the beet 37, as illustrated in Figure 5. Thus the beets are positively and firmly carried by the conveyor D up to the topping mechanism E which is provided with rotating knives which overlap in a manner to cut the tops off of the beets 37 automatically as they are carried toward the same. These topping knives are of a construction as has been defined in the application of Pierson, Serial No. 572,317, and which are constructed with mechanism to adjust the cutting knives in relation to the body of the beet 37 to cut the foliage clean, automatically off of the body of the beet 37.

The prongs 19 are formed with forwardly extending spaced apart ends 38 which are bent to act as foliage guiding prongs running along on top of the ground above the elevating plow 17. The prongs 19 converge backwardly toward the frame members 21 to which they are attached at 39, and the portion between the front ends 38 and the attached end 39 arches upwardly at 40, which portions converge toward each other of the respective prongs 19 and form arches over the receiving end 18 of the conveyor D and over the sprockets 24 and 25. Each prong 19 is provided with a rearwardly extending under prong 41 which projects below the sprockets 24 and 25, forming a space between the prong 41 and the arched portion 40 to permit the fingers 23 to be free to pass in collecting the foliage of the beets as they are elevated up to the conveyor D. Thus the prongs 19 guide the foliage of the beet, as well as the body thereof, which may be engaged by the prongs 41 while it is forced into the conveyor D. In this manner the beets are uniformly carried in the spaced apart position in which they are taken from the ground, with the foliage projecting upwardly into the conveyor which carries them rapidly to the topper E where their tops are cut off automatically. The operation of the harvester continues with precision and accuracy which is very desirable and provides a means of topping the beets of the foliage more uniformly and accurately than has been accomplished heretofore.

Where the fingers or lugs 23 are secured to the different links of the chains 20, as illustrated in Figure 1 and in Figure 3, they are formed so as to project on either side of the chain 20. The chains 20 run around the idle sprockets 24 and 25 and as the chains pass around these sprockets the fingers 23 intermesh and slide up the inclined frame formed by the side members 21 with the fingers 23 resting on the wearing plates 22. Thus the chains 20 are held in line as illustrated in Figures 4 and 5 in carrying the beets up the conveyor D and the foliage 36 is collected and guided by the fingers 23 of the conveyor D. It may be desirable to form the conveyor chains 20 as illustrated in detail in Figure 7 with the lugs 40 projecting only on one side of the chain 20 so as to act as a guide sliding over the wearing plate 22. When the chain 20 is formed in this manner then the sprocket wheels such as 24 and 25 may be substituted by the sprocket 41 which carries the fingers 42 alternately between the teeth of the same so that each sprocket such as 24 and 25 would be substituted by a sprocket like 41 having fingers 42. In this construction the fingers 42 would intermesh and overlap at a point through the radii of the sprockets and thus the fingers 42 on the sprockets 41 would act to collect the foliage into the conveyor D.

A further variation may be employed in the harvester A in using conveyor chains 20 without lugs thereon and by using a multiplicity of guiding sprockets 43 which are mounted in the side frame portions 21 as illustrated in Figure 8. It would still be desirable to use sprockets 41 with the fingers 42 when using a chain 20 which would be guided by the sprockets 43 and when neither of the fingers 23 nor the lugs 40 are used on the chains 20. The collecting and guiding fingers 42 on the sprockets 41 is only illustrative of a means of providing fingers for gathering the foliage into the conveyor D and it is also true that the fingers 23 may be substituted for other collecting and guiding means for holding the chains 20 in operative position in the conveyor D. The principle is apparent and it is important in the successful operation of the harvester A.

The engine C which may be of any type of nature is connected by suitable means to the operating parts of the harvester A so as to drive the chains 20 of the conveyor D. The slack of the chains 20 is carried around on suitable idle pulleys outside of the track frame 21. The connection between the engine and the conveyor chains 20 is only illustrated diagrammatically in Figure 1 and is not shown in detail, the same being of ordinary well known type where an operating clutch may be employed between the engine C and the conveyor D. The same is true in regard to the topper means E which cuts off the foliage from the body of the beets and which is adapted to be driven by a series of gears 45 so that when the engine C is operating the operator may manipulate a clutch in any suitable manner which will cause the same to drive the conveyor D and the topper E when it is desired. It is also true that the operator may release the driving of the engine C so that the conveyor D and the topper mechanism E will be stopped.

A series of yoke frame portions 46 having an arch-like formation extend over and above the frame portions 21 and these are adapted to hold the same spaced apart with a clear space above the frame portions 21 for the foliage to travel in along the conveyor D.

In the operation of the harvester A the beets are elevated by the plow 17 while the prongs 19 guide the foliage between the sides of the same assisted by the rear prongs 41, guiding the beets with the foliage collected into the conveyor D and carrying the beets up to the topper knives, all of which operation is automatic and timed with accuracy that permits the harvester A to be operated rapidly along the rows of beets, lifting them from the ground and topping them in the single operation. The beets may be collected from the harvester in any suitable manner without being discharged back onto the ground, if it is desired. Thus I provide a beet harvester which removes the beets from the ground and disposes of the foliage in a simple and effective and positive manner.

In accordance with the patent statutes I have set forth the principal features and objects of my invention. The illustrations show a means of carrying out the primary features of the same and may be varied within the scope of the following claims without departing from the principles of the invention.

I claim:

1. A beet harvester including, a frame, means for guiding the frame, beet elevating plows, foliage guiding prongs mounted above said plows, an endless conveyor for receiving the beets including a series of foliage collecting fingers each of which is mounted above said conveyor adapted to intermesh and gather the foliage in relation to said prongs to carry the beets into said conveyor, which carries the beets into position to be topped of their foliage.

2. A beet harvester including, a conveyor formed with a pair of endless chains, means for guiding said chains in parallel relation through said conveyor, and a series of foliage collecting fingers mounted above the upper edges of said chains adapted to intermesh in said conveyor collecting the foliage and simultaneously supporting said chains in operative alinement in said conveyor.

3. A beet harvester and the like including, a conveyor, spring track means in said conveyor, carrying link chains operable in said track, idle sprockets for said chains, said spring track urging said chains toward each other in said conveyor, and means above said chains for holding the portions of said chains in said track in operative alinement.

4. A conveyor for a beet harvester including, a pair of conveyor chains, a frame in which said chains are adapted to operate, spring means for pressing said chains toward each other in said frame, and finger lugs carried by said chains spaced above the upper edge thereof adapted to act as foliage collecting means and supporting elements for guiding said chains in operative alinement while operating under spring tension urged toward each other.

5. A conveyor for a beet harvester and the like including, a pair of conveying chains, a track frame in which said chains are adapted to operate, resilient means for holding said chains urged toward each other in said frame, idle sprockets at the receiving end of said conveyor for each of said chains, means for mounting one of said sprockets rigidly in operative position, and bell crank means for adjustably and resiliently operating the other of said sprockets to permit the same to move away from the rigidly held sprocket so as to open said conveyor to receive foliage between said chains thereof.

6. A conveyor for a beet harvester comprising, a pair of link chains, sprockets for carrying said chains, a pair of idle sprockets at the receiving end of said conveyor, means for mounting one of said sprockets and a bell crank lever supporting the other of said pair of sprockets resiliently to permit said conveyor to open readily to receive the beet foliage therebetween, rigid means for adjusting the resiliency of said mounting means, and means for operating said conveyor chains in unison.

7. A conveyor for a beet harvester comprising, a series of conveying endless link chains, a pair of idle sprockets at the receiving end of said conveyor, a spring track between which said chains are adapted to operate to hold the chains in spring contact with each other through said conveyor, means above said conveyor for holding said chains in operative alinement with each other in said spring track, and means for adjustably and resiliently supporting one of the sprockets of said pair to permit the opening of the space between the chains of said conveyor by more or less foliage passing between the same, and means for operating said conveyor in unison.

8. A conveyor for a beet harvester including, a pair of track members, arched frame portions for spacing said track members apart, a resilient bearing plate in said track, endless conveyor chains, means above said conveyor for carrying said conveyor chains in said track urged by said spring bearing plate toward each other, and resiliently operated together to receive foliage therebetween, and foliage collecting fingers above the adjacent surfaces of the conveyors which collect the foliage at the receiving end of said conveyor which act also to guide and hold the chains of the conveyor in operative alinement.

9. A conveyor for a beet harvester including, a pair of endless chains, means positioned above said endless chains for both guiding said chains into operative alinement to resiliently engage beet foliage between the same, and for engaging the beet tops directly, idle sprocket means at the receiving end of said conveyor, and means for resiliently supporting said sprocket means at the receiving end of the conveyor to permit the conveyor chains to open and freely receive foliage into said conveyor.

10. A conveyor for beet harvesters and the like including, a pair of co-operating link chains, chain supporting means from which said chain depends, idle sprockets for supporting said chains, a spring guide track between which said chains are adapted to be carried in a manner to resiliently urge said chains toward each other, and a flexible receiving end formed in said conveyor to permit more or less foliage to be crowded between the conveying chains of the same, and means for gathering the foliage into said conveyor.

11. A beet harvester including, lifting plow means for elevating the beets out of the ground, foliage guiding prongs adjustably supported in relation to said plow means, an endless conveyor including a spring track, conveyor chains operatively supported in said track, foliage collecting means in said conveyor at the receiving end thereof, and guiding means above said chains from which said chains depend for holding said conveyor chains in operative alinement in said spring track.

12. A beet harvester including, means for elevating the beets including the foliage from the ground, means for guiding the foliage of the beets into a collected upright position, conveyor means for receiving the foliage of the beets and carrying the same along the conveyor, conveyor supporting means above said conveyor from which said conveyor depends, means on said conveyor supporting means for extending into and engaging the foliage and means associated with said conveyor for topping the foliage from the body of the beets.

13. A conveyor for beet harvesters including, a pair of opposed conveyor members, means for operating said members to travel together, to engage the foliage of the beets in conveying the same, means for bunching the foliage of the beets to be conveyed, and introducing the same into said conveyor, means for holding said conveyor members substantially parallel throughout the major portion of their length, and an adjustably resiliently separable end on said conveyor to engage various amounts of foliage between said conveyors.

HUGO C. RASSMANN.